Patented Apr. 7, 1925.

1,532,419

UNITED STATES PATENT OFFICE.

GEORGE FREEMAN LLOYD, OF BRIGHTON, AND FRANK BOARDMAN CLAPP AND FREDERICK HARPER CAMPBELL, OF MELBOURNE, VICTORIA, AUSTRALIA, ASSIGNORS TO COMMONWEALTH WHITE LEAD AND PAINTS PROPRIETARY LIMITED, OF BRIGHTON, VICTORIA, AUSTRALIA.

PROCESS FOR THE MANUFACTURE OF WHITE LEAD.

No Drawing.   Application filed June 15, 1923.  Serial No. 645,701.

*To all whom it may concern:*

Be it known that GEORGE FREEMAN LLOYD, a subject of the King of Great Britain, residing at Coronation Street, Brighton, FRANK BOARDMAN CLAPP, a subject of the King of Great Britain, residing at 475 Collins Street, Melbourne, and FREDERICK HARPER CAMPBELL, residing at 35 William Street, Melbourne, all in the State of Victoria, Australia, have invented an Improved Process for the Manufacture of White Lead, of which the following is a specification.

The present invention relates to the manufacture of basic lead carbonate suitable for use as a pigment and has been proved by experimental work to possess advantages over the Dutch process principally in the saving of time insomuch that the product can be made during the course of an ordinary working day. The process according to this invention also provides a large increase in yield above that obtainable from a given weight of lead by the Dutch process in any one treatment.

Furthermore, the product obtainable by the use of this invention is superior to that of the Dutch process in that it is whiter in colour, is commercially free from impurities, e. g. acetate of lead, is more finely divided, has greater opacity and can be prepared of constant composition which can be varied at will within wide limits by suitable alterations in the proportions of the reagents used.

Our present process depends upon certain known reactions, but we claim that the modifications in the methods of applying these reactions, introduced by us, result in the avoidance of the defects of basic lead carbonates manufactured by known methods depending on precipitation, such as coarseness of grain, poor color and comparatively low opacity.

According to this invention a basic acetate of lead mixture is prepared by incorporating in any suitable manner litharge PbO free from red lead $Pb_3O_4$ and substantially free from metallic lead, with such a proportion of dilute acetic acid (of concentration between four and one half and 60 parts per centum by weight of absolute acid) that (1) there is not less than 16 parts nor more than 22 parts of absolute acetic acid for each 100 parts by weight of litharge treated and (2) the proportion of water in the basic acetate mixture is not less than 10 nor more than 73 parts per centum, by weight. This quantity of water is not sufficient to dissolve all of the lead salt, so that there results a saturated solution of the salt having mixed therewith undissolved lead salt; a slurry, so to speak. The use of very concentrated basic lead acetate reflects favourably upon the physical properties of the basic carbonate produced from it and this part of the process is distinct from that of Martin (English Patent 223 of 1876) in that in that invention the basic acetate is decomposed as rapidly as it is formed, and from that of Tatham & Tatham (English Patent 13886 of 1896) in the greater concentration employed by us. We have found that unless the proportion of acetic acid is equal to or above the lower limit given 16 to 22 parts of absolute acetic acid to 100 parts by weight of litharge it is difficult, if not impossible, to obtain a product of good colour, owing to the presence in it of litharge in such an extremely fine state of subdivision as to render its elimination by mechanical means impracticable.

Should the upper limit be exceeded the composition and physical properties of the product are prejudicially affected in respect of covering power and opacity.

It has been found, further, that while a satisfactory pigment is producible by conducting this part of the process at the ordinary temperature the reaction goes more rapidly and smoothly if the temperature is about 45° C. but that if the temperature exceeds 60° C. the opacity of the product is diminished.

The basic acetate is converted into basic carbonate by mixing it with a solution of normal and acid carbonates such as those of sodium potassium or ammonium in a suitable amount of water. The mixture may consist, for example, of sodium carbonate and bicarbonate, potassium carbonate and bicarbonate, sodium carbonate and potassium bicarbonate. If ammonium carbonates are used instead of the corresponding sodium salt the reaction should be brought about under a slight positive pressure of carbon dioxide. It has been found that it is impossible to convert the whole of the lead into basic carbonate of a white color by the use of a water soluble normal carbonate alone, the caustic alkali produced by the hydrolysis of the salt causing the development of a yellow color the intensity of which increases with the concentration of the alkali. On the other hand, we have found that the whole of the lead can be recovered in the form of basic carbonate which is not a definite chemical compound and hence has no definite composition of exceedingly good colour if a bicarbonate is used as a precipitant, but that the product tends to be low in hydrate of lead and of comparatively poor opacity. The disadvantages attending the use of either alone are not shared by mixtures of the two reagents and we find that a white compound containing from 25 to 30 per cent of lead hydroxide will result when for each part of litharge used in preparing the said basic acetate mixture we add not more than 2/5 nor less than 1/5 parts by weight of a mixture of 60 to 75 parts of sodium bicarbonate by weight with 40 to 25 parts sodium carbonate. This mixture of carbonates is prepared for use as above by adding thereto sufficient water to dissolve completely the carbonates or to leave part of the bicarbonate only in suspension. We are aware that the use of mixtures of sodium carbonate and bicarbonate is not new, but Lowe (English Patent 9122 of 1887) and others (cf. Dammar, Handbuch der anorg Chem. P. P. 570) aimed at the formation of normal lead carbonate and in their mixtures and in that of White & Patterson (English Patent 9638 of 1912) the ratios of bicarbonate to carbonate differ markedly from those found essential by us.

The product of the above processes is washed in a filter press, centrifuge, or other suitable device with water or with a dilute aqueous solution of normal or basic lead acetate, preferably the latter in quantity slightly more than equivalent to the amount of carbonate and/or bicarbonate absorbed by the precipitate to facilitate the removal of these alkaline salts. When the acetate solution is employed the purification is completed by washing with water. The acetic acid is recovered from the acetate solution with but little loss by treatment with a suitable mineral acid and subsequent distillation.

Instead of preparing the basic lead acetate mixture as above set forth, we may mix with the litharge an aqueous solution containing from 3 per cent to 18 per cent by weight of sodium acetate and generate in situ the necessary acetic acid by the addition of the calculated quantity of dilute sulphuric acid. It will be obvious that any other acetate, the reaction compound of whose base is soluble in water, such as potassium or ammonium acetate may be substituted for sodium acetate in which case the percentage used will be the reaction equivalents of such salts in the case of potassium acetate would be approximately 22 per cent maximum or 3.6 per cent minimum or in the case of ammonium acetate 17 per cent maximum or 2.8 per cent minimum. We find that this modification gives at a lower cost a product substantially free from sulphates and equal in all respects to that of the process first described. In regard to the treatment of the white lead with normal or basic lead acetate aqueous solution we are aware that as mentioned by White (English Patent 6683 of 1891) the proportion of hydroxide can be increased by treatment of white lead with basic lead acetate solution, but this step in our process is differentiated from others by the fact (1) that we use a very dilute solution (one half to two per cent), (2) that it is employed only for the purpose of reacting upon the traces of carbonate and bicarbonate of sodium, which are obstinately held or adsorbed by the white lead and (3) that while it does increase the proportion of hydrate such increase is slight and unimportant.

The process conducted as above described gives products of the properties above mentioned but the presence during the formation of the basic lead acetate mixture of sufficient sodium or other suitable water soluble acetate to give a solution of from 10 to 15 per cent strength considerably increases the opacity of the product, as does also the practice of adding the bicarbonate partly in solution and partly suspended in water, together with the whole of the normal carbonate, and the rest of the bicarbonate in the dry condition. The opacity of a pigment of given chemical composition depends upon the average size of the particles constituting it. We have found by microscopic examination that the particles of our product are markedly smaller than are those of stack-made white lead and to that we attribute at least partly its greater opacity. As is known the greater the concentration and viscosity of the solution from which a precipitate is thrown down the smaller will be the constituent particles. We have found that the result of increasing the viscosity of the reaction mixture by the use of an acetate, such as sodium acetate, is to diminish the size of the particles, but that when the concentration exceeds 15 per cent the opacity begins to fall off again, owing presumably, to the presence of an increasing proportion of particles of ultra-microscopic size.

By way of examples but not in any way limiting the scope of our invention, we give the following:—

*Example I.*—We treat 8 lbs. of litharge with 75 ozs. by weight of 30% acetic acid and 9 ozs. of hydrated sodium acetate ($NaC_2H_3O_2.3H_2O$) dissolved in 4 lbs. of water at an initial temperature of 30°–60° C. On the conversion of the whole of the litharge into the basic acetate mixture, we add a mixture of 13½ ozs. of sodium bicarbonate, 14 ozs. of sodium carbonate and 5½ lbs. of water. The temperature of the latter mixture should not exceed 30° C. After thorough mixing, 13½ ozs. of dry sodium bicarbonate is added and after a final mixing the basic lead carbonate is removed, separated from the mother liquor as completely as possible, washed slightly with water, drained, removed from the filter, mixed thoroughly with a half per cent by weight solution of basic lead acetate of variable composition slightly more than equivalent to the alkaline salts present, returned to the filter and finally washed with water. It is then dried or incorporated with oil in the usual manner.

*Example II.*—We treat 8 lbs. of litharge with 3 lbs. 14 ozs. of sodium acetate dissolved in 6 lbs. of water (or a mixture of water and mother liquor from a previous batch containing water and sodium acetate in the proportions given) at an initial temperature of 30°–60° C. and 1 lb. 3 ozs. of 96 per cent sulphuric acid in 4 lbs. of water. On conversion of the whole of the litharge into acetates we complete the process in accordance with Example I.

We claim—

1. In the manufacture of white lead, a process for the preparation of a basic acetate of lead mixture characterized by the treatment of litharge with an aqueous solution containing not less than 4½ nor more than 60 per cent of absolute acetic acid, in such proportion that there is present not less than 16 per cent nor more than 22 per cent of absolute acetic acid calculated on the weight of litharge originally present and that the finished mixture contains not less than 10 nor more than 73 parts per cent of water, at a temperature not exceeding 60° C.

2. In the manufacture of white lead, a process for the preparation of a basic acetate of lead mixture characterized by the treatment of litharge with an aqueous solution containing not less than 4½ nor more than 60 per cent of absolute acetic acid in such proportion that there is present not less than 16 per cent nor more than 22 per cent of absolute acetic acid calculated on the weight of litharge originally present together with from 10 per cent to 15 per cent of sodium acetate and that the finished mixture contains not less than 10 nor more than 73 parts per cent of water at a temperature not exceeding 60° C.

3. In the manufacture of white lead, a process for the preparation of a basic acetate of lead mixture, characterized by the treatment of litharge with an aqueous solution containing from 3 to 18 per cent of sodium acetate and adding thereto a dilute aqueous solution of sulphuric acid, in such proportion that the amount of acetic acid liberated by the action of the sulphuric acid on the acetate is not less than 16 per cent nor more than 22 per cent calculated on the weight of litharge originally present, and that the concentrations of the aqueous solutions of acetate and sulphuric acid are such that the finished mixture contains not less than 30 nor more than 73 parts per cent of water at a temperature not exceeding 60° C.

4. In the manufacture of white-lead by converting basic lead acetate mixture into basic carbonate of lead by addition to it of an aqueous solution of sodium carbonate and bicarbonate, the carbonate being wholly in solution and the bicarbonate preferably partly in solution and partly in suspension and in which the proportion of the former is not less than 25 nor more than 40 per cent of the total solids, the proportion by weight of the two carbonates together being not greater than two-fifths nor less than one-fifth of that of the litharge used in preparing the original mixture.

5. In the manufacture of white-lead as set forth, increasing the opacity of the product by the addition to the basic lead acetate mixture of only part of the sodium bicarbonate together with the whole of the normal sodium carbonate in aqueous solution, the remainder being afterwards added in the dry condition.

6. Process of making white lead, which comprises precipitating white lead from an aqueous solution of a lead salt by a mixture of a carbonate and a bicarbonate of an alkali metal in the ratio of not less than 2 to 3, nor greater than 1 to 3, while maintaining the solution concentration of the carbonate mixture.

7. Process of making white lead, which comprises precipitating the same from an aqueous solution of a lead salt by a mixture of a carbonate and a bicarbonate of an alkali metal in the ratio of not les sthan 2 to 3 nor greater than 1 to 3, while maintaining the solution concentration of the carbonate mixture and the lead salt.

8. Process of making white lead, which comprises precipitating the same from an aqueous solution of a lead salt by a mixture of a carbonate and a bicarbonate of an alkali metal in the ratio of not less than 2 to 3 and not greater than 1 to 3 while maintaining the solution concentration, and treating the resulting product with a dilute aqueous solution of a lead acetate in quantity slightly in excess of the equivalent quantity of alkali metal salt adsorbed in the precipitate, and finally washing with water.

9. A process for the manufacture of white lead, which comprises precipitating by interaction in aqueous solution of a water-soluble lead salt and an alkali metal carbonate and bicarbonate in approximately stoicheiometrically correct proportions, the relative concentrations of said substances being maintained substantially constant throughout the precipitating process.

10. A process for the manufacture of white lead, which comprises precipitating by interaction in aqueous solution of a basic lead acetate and an alkali metal carbonate and bicarbonate in approximately stoicheiometrically correct proportions, the relative concentrations of said substances being maintained substantially constant throughout the precipitating process.

Dated this 30th day of April, 1923.

GEORGE FREEMAN LLOYD.
FRANK BOARDMAN CLAPP.
FREDERICK HARPER CAMPBELL.